July 3, 1923.  1,460,871

G. C. TROTTER

AUTOMATIC STOP FOR PHONOGPAPHS

Filed Oct. 20, 1919  4 Sheets-Sheet 1

Witnesses:
Harry R. L. White.
W. P. Kilroy

Inventor
George C. Trotter,
By H. C. Duvall
Atty.

Witnesses:
Harry R. White
W. F. Kilroy

Inventor:
George C. Trotter,
By W. J. Duvall, Atty.

July 3, 1923.

G. C. TROTTER

AUTOMATIC STOP FOR PHONOGRAPHS

Filed Oct. 20, 1919    4 Sheets-Sheet 3

Witnesses
Harry R. L. White
W. P. Kilroy

Inventor,
Geo. C. Trotter,
by W. J. Duvall
Atty.

July 3, 1923.
G. C. TROTTER
AUTOMATIC STOP FOR PHONOGRAPHS
Filed Oct. 20, 1919 4 Sheets-Sheet 4
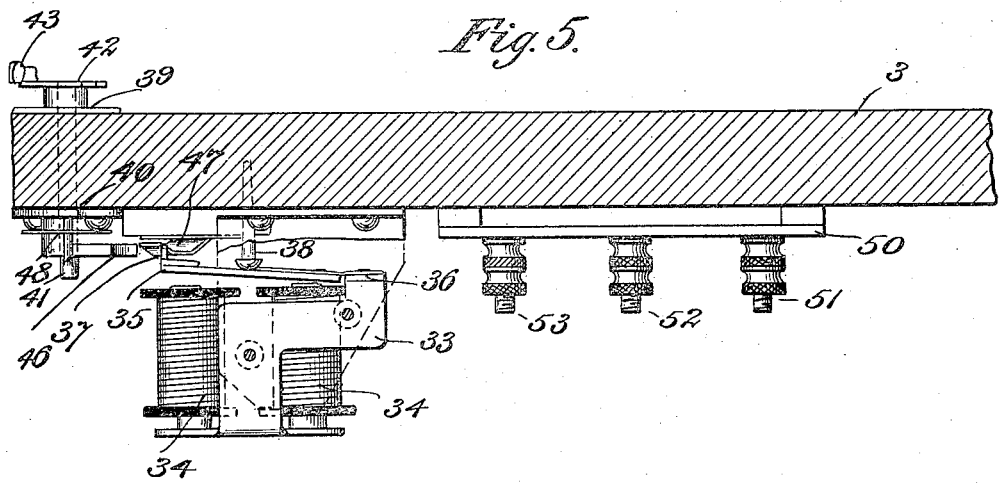
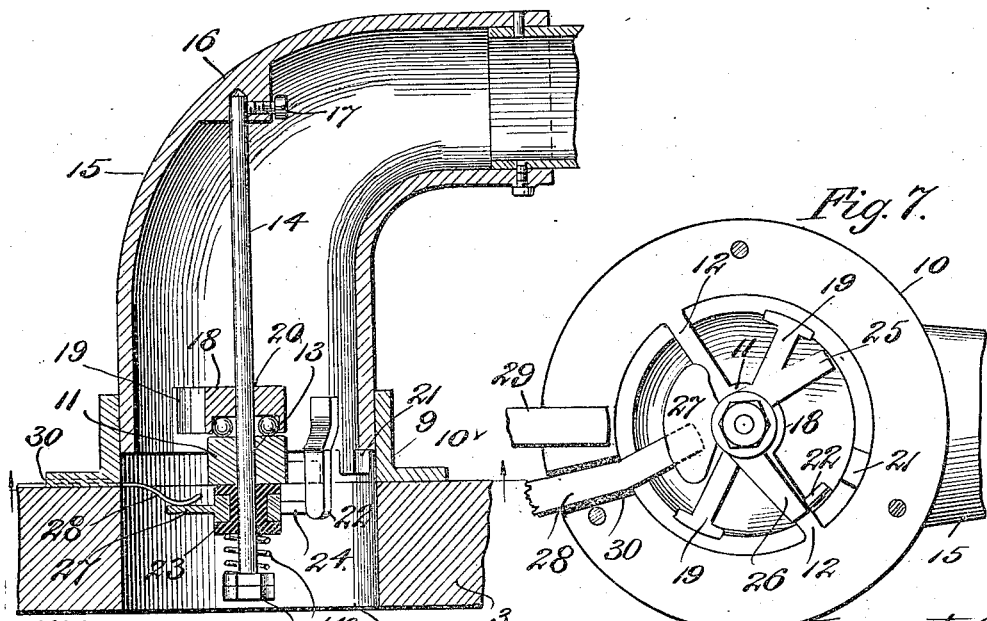
Witnesses:
Harry R. L. White
W. T. Kilroy
Inventor
George C. Trotter,
By W. J. Duvall, Atty.

Patented July 3, 1923.

1,460,871

UNITED STATES PATENT OFFICE.

GEORGE C. TROTTER, OF CHICAGO, ILLINOIS, ASSIGNOR TO PLYMOUTH PHONOGRAPH PARTS CO., OF PLYMOUTH, WISCONSIN, A CORPORATION OF WISCONSIN.

AUTOMATIC STOP FOR PHONOGRAPHS.

Application filed October 20, 1919. Serial No. 332,032.

*To all whom it may concern:*

Be it known that I, GEORGE C. TROTTER, a citizen of the United States, residing at Chicago, in the county of Cook and State of Illinois, have invented a new and useful Automatic Stop for Phonographs, of which the following is a specification.

This invention relates to phonographs or talking-machines, having particular reference to the means employed for stopping the machine automatically at the end of the record being played or at any other point thereof.

The principal objects of the invention are to produce a simply constructed stop-mechanism capable of operating to instantly stop the machine at any predetermined point of the record being played and which is set for such stoppage by a simple manipulation of the tone-arm; also to so construct such stop-mechanism as when operated will, in addition to stopping the operation of the machine, cut off or interrupt the current to the motor, should the motor be electrically operated.

Other objects and advantages of the invention will hereinafter appear, and the novel features of the invention will be more particularly pointed out in the appended claims.

Referring to the drawings:

Fig. 5 is a vertical transverse view through the base-board looking toward the stop-mechanism and viewing the latter in side elevation, the section being taken on the line 5—5 of Fig. 3;

Fig. 6 is an enlarged detail in vertical longitudinal section of the base of the tone-arm; and Fig. 7 is an inverted detail view in plan of the tone-arm.

Figs. 8 and 9 are fragmentary views hereinafter referred to.

Similar numerals of reference indicate similar parts throughout the drawings.

Figure 1:
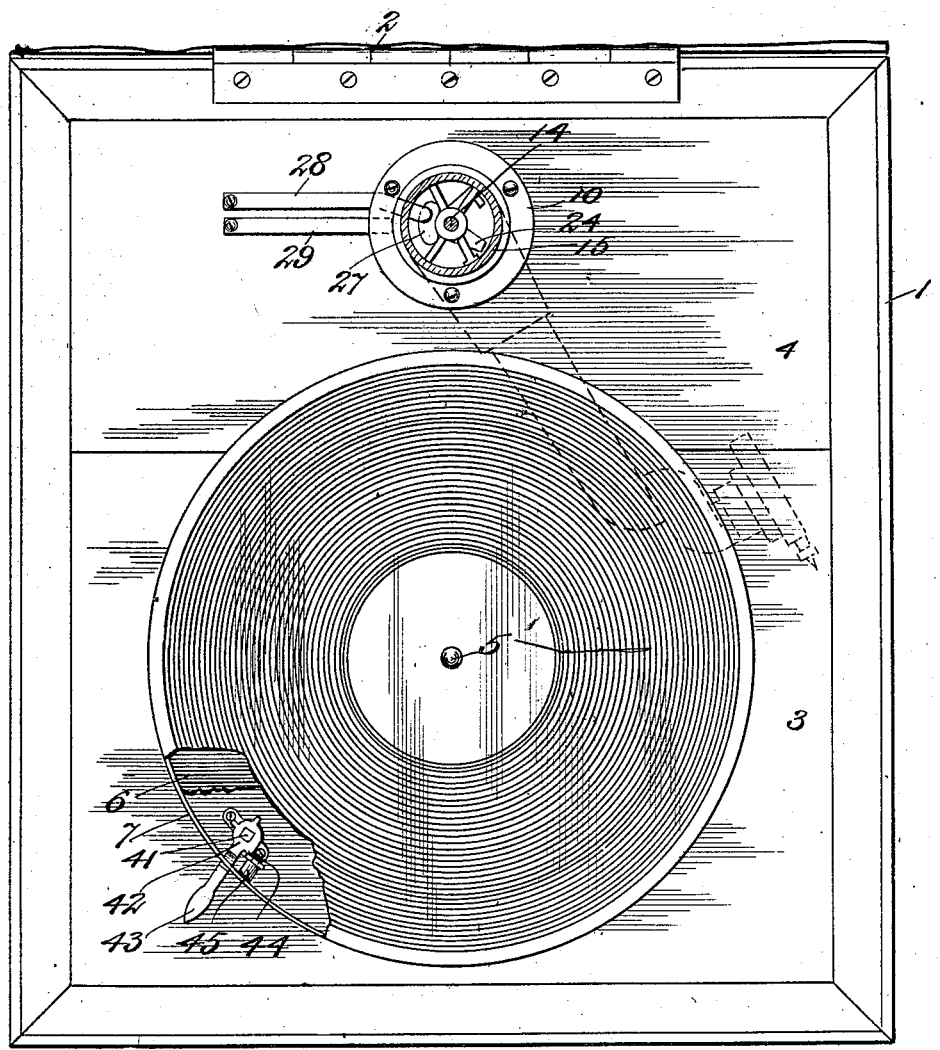
Fig. 1 is a top plan view of the conventional style of phonograph or talking-machine embodying a typification of my invention, the tone-arm being shown in horizontal section so as to expose the interior of its base-portion and by dotted lines as being swung to the extreme right.
Figure 2:
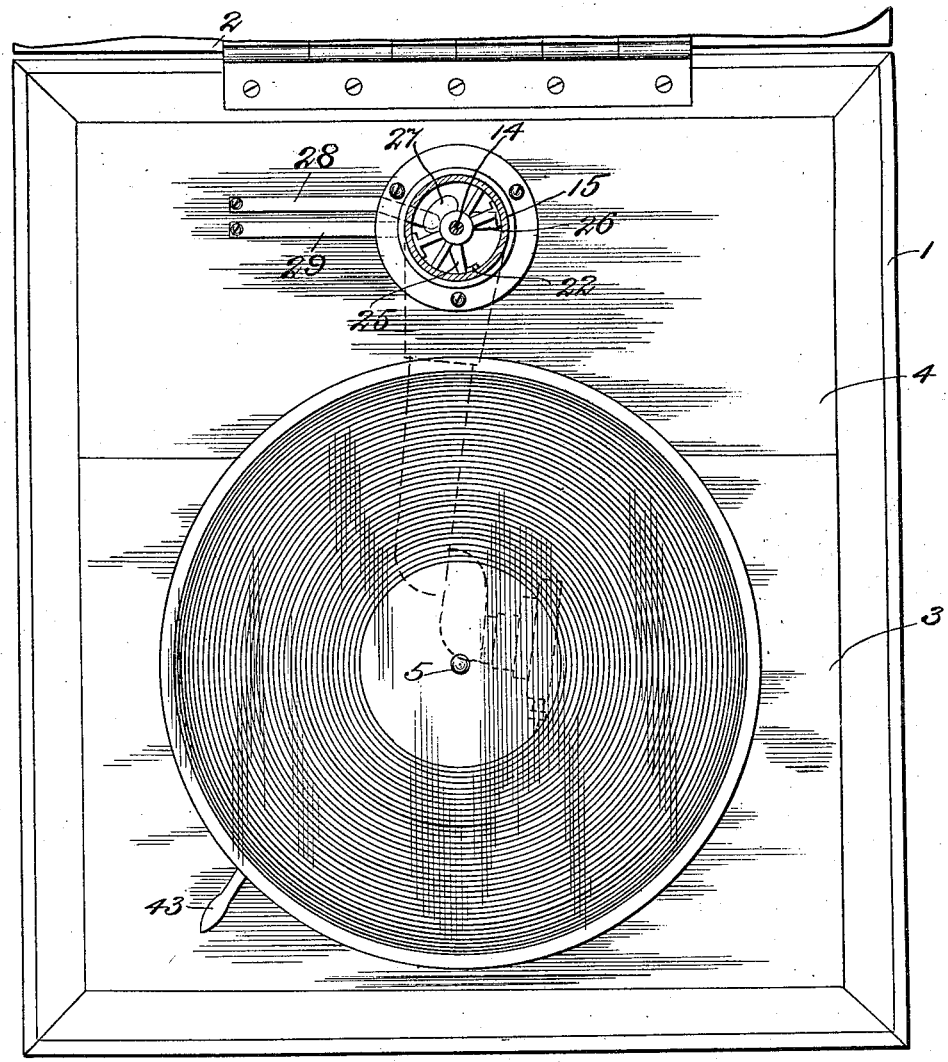
Fig. 2 is a similar view with the tone-arm shown by dotted lines swung to the left sufficiently far to bring the stylus or needle to the point of the record to be played where it is desired to stop the machine—generally at the end of the record.

In order to clearly illustrate my invention, I have shown the present typification of the same in connection with so much of the conventional style of phonograph or talking-machine as is necessary to show its application, but it is to be understood that the style of the machine has nothing whatever to do with the invention, and that, therefore, the cabinet of the machine as well as the typification now to be described are both subject to material modification and are fully comprehended by the invention.

The cabinet 1, of the machine, has the hinged cover 2, and the base-board 3, hinged to the frame of the machine or stationary portion of the base, 4, as is usual.

Upwardly through an orifice in the hinged member of the base-board extends the record-supporting staff or shaft 5, carrying the revolving turn-table 6, conventionally formed of sheet-metal and having the depending peripheral flange 7.

Over the usual tone-arm opening 8, in the stationary member of the base-board, in rear of the turn-table, is mounted the tone-arm base-ring 9, the same being made annular, as is usual, and provided with a horizontal attaching flange 10, through which screws are passed for securing the same to the base-board. The tone-arm base-ring 9, is provided with a centrally located hub 11, from which radiate arms 12, to the wall of the ring for the purpose of supporting the hub. (See Fig. 7.) The hub is bored vertically, as at 13, to receive a vertical shaft 14, that extends above and below the hub, the shaft carrying a spring $14^a$ and lock-nuts $14^b$.

The elbow 15, of the tone-arm, at a suitable point above its lower end, is provided with an internal bearing 16, into which the upper end of the shaft 14 projects, and a set-screw 17, projects through the bearing and impinges upon the said shaft, so that, as will be obvious, the shaft and the tone-arm turn together. The lower end of the tone-arm is received by the vertical flange of the base-ring, and like the latter, is provided with a central hub 18, supported by radiating arms 19, connected with the interior of the tone-arm, said hub being bored, as at 20, to receive the shaft 14. The lower edge of the elbow of the tone-arm is further provided at its front with a depending stop-lug 21, sufficiently long to abut against the radiating arms 12 of the base-ring 9 and thus limit the swing or oscillation of the arm to approximately half a circle, and said edge is further provided immediately adjacent the said stop-lug 21 with a depending combined shifting or setting and circuit-closing arm 22, that depends to a point below the radiating arms 12 and lug 21 and in the path of said arms 12 as well as in the path of certain other mechanism hereafter referred to.

Mounted loosely upon the shaft 14, through the instrumentality of a flange insulating spool 23, is a combined "setting" and circuit making element 24, in this instance, of bell-crank shape, comprising the angularly disposed arms 25 and 26, relatively disposed at substantially an angle of 45 degrees and positioned at opposite sides of and lying in the path of the arm 22, heretofore refererd to, so as to be struck and oscillated by the same during the swinging movements of the tone-arm. At a point opposite the arms 25 and 26 of the element 24, the latter has formed a fan-shaped or segmental contact-plate 27, the function of which will hereafter appear.

At one side of the tone-arm base, upon the stationary portion of the base-board, are mounted a pair of stationary contact-strips or plates, designated as 28 and 29, respectively, the former plate being extended well into the tone-arm opening in the base-board and into the path of the contact-plate 27 so as to establish constant electrical connection therewith during the oscillations of the latter plate. Otherwise the contact-plate 28 is insulated from the tone-arm by proper insulating material 30, inserted between the plate and the base.

Figure 4:
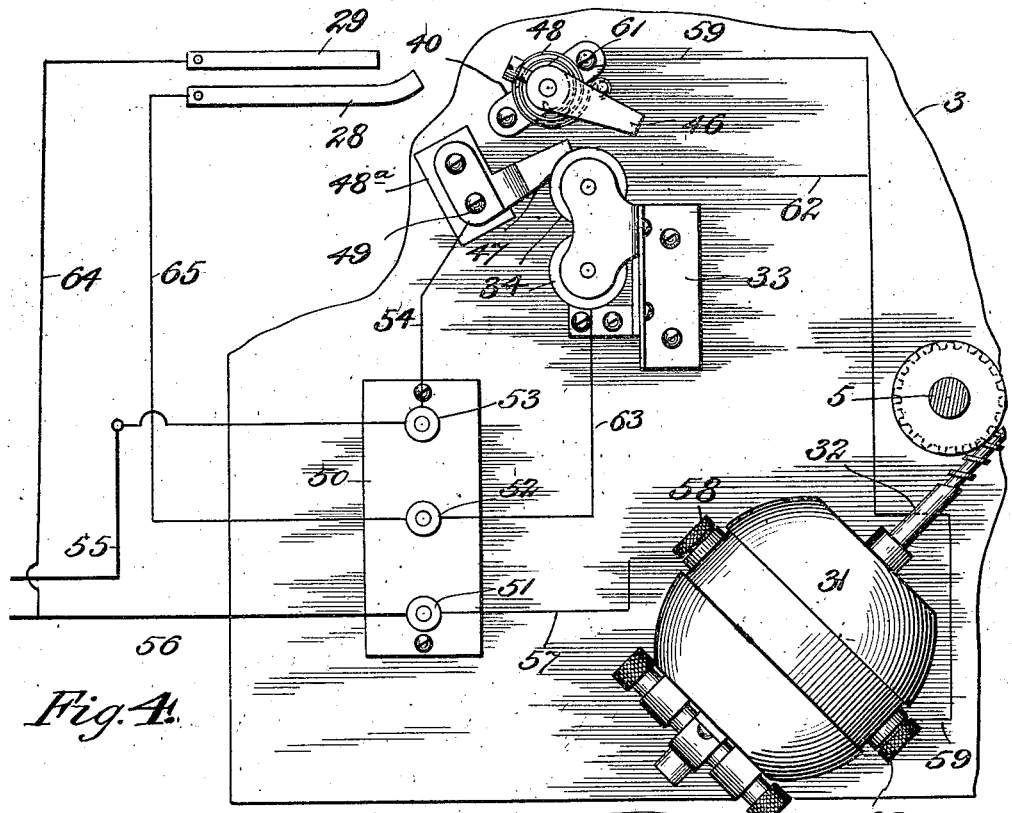
Fig. 4 is a similar view illustrating the stop-mechanism in the position it occupies after the automatic release has operated.
Figure 3:
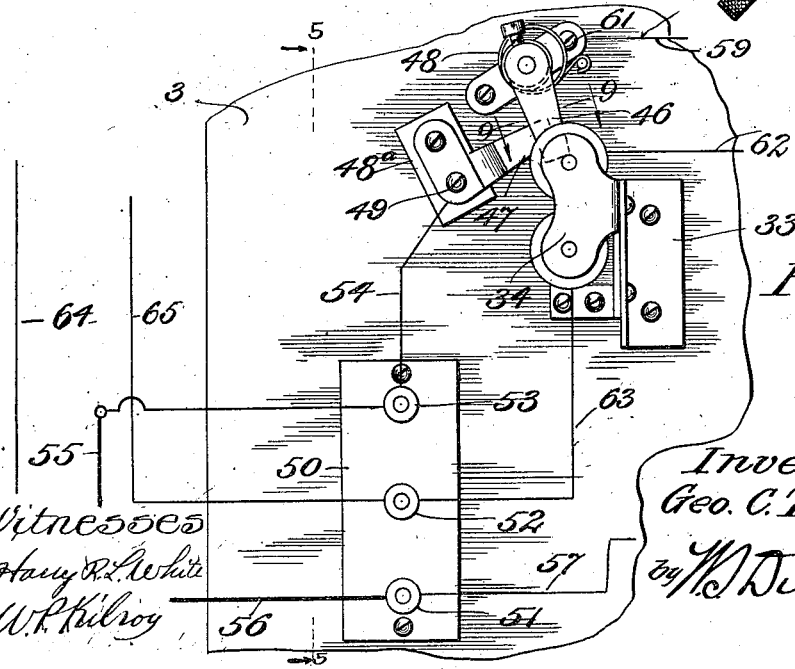
Fig. 3 is a plan view of the base-board of the machine, said board being illustrated in its inverted position and illustrating the stop-mechanism in the position it occupies when "set" to operate at a predetermined point on the record.

We will now refer more particularly to Figs. 3, 4 and 5 of the drawings, the same illustrating the mechanism secured to the underside of the movable portion of the base-board and which is "set" and released by the mechanism heretofore described.

31 designates an electric-motor of any desired type, the drive-shaft 32 of which, it will be understood, is operatively connected by any suitable power-transmitting mechanism to the turn-table shaft 5 of the machine. This motor, it will be understood, may be operated by electric-current received from any source of supply most convenient.

Figure 9:
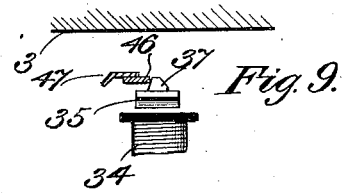

Supported in any convenient manner so as to depend from the underside of the base-board, as, for instance, by an angular supporting-standard 33, is an electro-magnet 34, having a spring supported armature 35, secured to the supporting-standard, as at 36, and provided upon its upper side and at its free end with a locking-shoulder 37. (See Fig. 9.) A set-screw 38, may be inserted in the underside of the base-board immediately above the armature to limit the upward movement of the latter.

Figure 8:
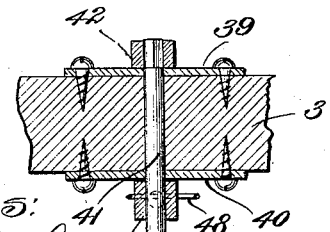

In openings formed in suitable bearing-plates mounted upon the upper and lower sides of the movable portion of the base-board, and respectively numbered as 39 and 40, is mounted the oscillating stop-shaft 41, (see Fig. 8,) which, as usual, projects above the board and carries a head 42, from which projects an operating-handle 43, that extends without the path of the record-supporting disk so that it may be conveniently manually manipulated, and also a radial stop-arm 44 (see Fig. 1,) disposed at an angle to the operating-handle, and carrying a friction-stop 45, usually of felt, adapted when the stop occupies a certain position to take frictional contact against the inner surface of the depending flange 7 of the turn-table and arrest its further rotations. A rock-arm 46, (see Figs. 3 and 4,) radiates from the lower end of the stop-shaft 41 and moves therewith, and about the latter is arranged a coiled spring 48, the tendency of which is to rotate the shaft in a direction to normally apply the brake 45 to the rim of the record-carrying disk. By manipulating the operating-handle 43, it will be obvious that the shaft 41 may be partly rotated so that the rock-arm 46 will become engaged by the locking-shoulder 37 of the armature, normally elevated by its spring-connection 36, and thus the stop or brake locked out of contact with the flange 7 of the turn-table—as when the machine is in the act of playing.

Secured to the under side of the base-board at one side of the electro-magnet, and in the path of the rock-arm 46, so as to electrically contact with said arm when the latter is in locking engagement with the armature, is a spring contact-plate 47, the same being mounted upon a suitable insulating attaching-plate 48ª, and having a binding-post 49.

At a point upon the base-board adjacent the motor and electro-magnet, is mounted an insulating-plate 50, upon which is, in this instance, located a series of three binding-posts 51, 52 and 53, the latter post being connected by a wire 54, with the binding-post 49 of the contact-plate 47. Current-supplying conductors 55 and 56, lead respectively to the two outer binding-posts 53 and 51, and, as before stated, these may lead from any source of electrical-supply. A wire 57, connects the post 51 with the post 58 of the motor, and a wire 59, connects the opposite post 60, of the motor with a binding-post 61, located on the bearing-plate 40 that receives and supports the oscillating stop-shaft 41, a branch-wire 62, leading from the latter wire to one pole of the electro-magnet in advance of the binding-post 61. The remaining pole of the magnet is connected to the central binding-post 52 by a short wire 63. This completes the wiring, with the exception, of wires 64 and 65, the latter leading from the central binding-post 52 to the contact-plate 28 in constant contact with the segmental contact-plate of the tone-arm, and the former wire leading from the supply-wire 56 to that contact-plate 29 in electrical contact with the base of the tone-arm.

As thus constructed, the operation is as follows:

Assuming the parts to occupy the position in which they are illustrated in Fig. 4 of the drawings and the record to be played by the machine to be positioned upon the turn-table, the tone-arm is first swung to the right until its depending arm 22 abuts against the adjacent stationary radiating arm 12, when further pivotal movement of the tone-arm in that direction will be arrested. During this swing to the right of the tone-arm, it will be seen its depending arm 22 will have engaged with the arm 26 of the oscillating "setting" element 24, causing the latter to swing to the right. The tone-arm is now swung in a reverse direction or to the left, the depending arm 22 of the tone-arm engaging with the companion arm 25 of the "setting" element and carrying said element and its arms in the same direction. This movement to the left is continued only until the stylus or needle of the machine has reached either the end of the record or some predetermined intermediate point thereon where the operator desires the stop-mechanism to operate. The tone-arm is then again swung to the right to bring the stylus to that point of the record where playing is to begin but short of the arm 26, so that the position of the setting-element is not again disturbed. Thus it will be seen that when this latter movement takes place, the "setting" element will be left at rest with its arm 25 located at such point with relation to the record being played that when the needle or stylus reaches that point the depending arm 22 of the tone-arm will make electrical contact with the arm 25 and the electric circuit will be completed.

When the parts are thus set, it only remains to start the machine by moving the operating-handle 43 of the stop-mechanism to the right. This, as will be seen, removes the friction-head or brake from contact with the depending flange of the turn-table, engages the rock-arm of the stop-shaft with the spring actuated armature, whereby the rock-arm becomes locked against the tendency of its spring, and establishes the circuit to the motor by contact of the rock-arm with the spring contact plate 47, by wire 59.

When, as before stated, the tone-arm reaches that point where its depending arm 22 contacts with the arm 25 of the "setting" element, an electrical circuit is completed between the electrical source of supply, and the electro-magnet, as will be obvious, and the magnet becoming energized and attracting the armature, the latter will be caused to disengage from its locking position with the rock-arm of the stop-shaft, thus permitting the latter to be oscillated by its spring whereby to throw its friction-head to "brake" position against the depending rim or flange of the turn-table. The liberation of the stop-shaft and the consequent movement of the rock-arm, causes the latter to break connection with the spring contact-plate 47, so that simultaneous with the stoppage of the turn-table the current is cut off from the motor.

While I have shown and described my invention in connection with a phonograph or talking-machine operated by an electrically-driven motor, and have, therefore, preferably included means for arresting the supply of current to the motor simultaneous with the "braking" of the turn-table, at the same time it will be perfectly obvious that the stop-mechanism described is just as applicable to phonographs or talking-machines otherwise operated, one or more ordinary commercial dry-cells being utilized for energizing the electro-magnet. In such instance, the wiring shown and described would be considerably simplified and the binding-posts 51, 52 and 53, their plates together with the spring contact-plate 47, omitted altogether, it merely remaining to connect one pole of the battery with one pole of the electro-magnet and the remaining pole of the latter to the stop-shaft bearing-plate 61 and with the remaining pole of the battery.

Many modifications in the details of parts and in the arrangements shown will readily suggest themselves, so that I would have it understood that I do not pretend to limit my invention to the details and arrangements shown and described, such merely being one simple typification of my invention.

Having described my invention, what I claim, is:

1. In a phonograph, the combination of a rotary record-supporting means, a brake adapted when released to automatically brake upon and arrest the movement of said record-supporting means, an electro-magnet, the armature of which when deenergized, engages the brake and holds it in its inoperative position, a source of electrical supply, a swiveled tone-arm, a contact below and insulated therefrom, a contact carried by and within the tone-arm and adapted to contact with the first mentioned contact when the tone-arm is at a certain point of its travel, and electrical connections between the electrical supply, the electro-magnet and the two contacts, whereby when the circuit is completed by the contacts the electro-magnet is energized and its armature magnetized to release the said brake.

2. In a phonograph, the combination of a rotary record-supporting means, a brake adapted when released to automatically brake upon and arrest the movement of said record-supporting means, an electro-magnet, the armature of which, when deenergized, engages the brake and holds it in its inoperative position, a source of electrical supply, a swiveled tone-arm, a pivotally movable contact supported below and insulated from the tone-arm base, a contact carried by the tone-arm and adapted to contact with the first mentioned contact, means for positioning said first mentioned contact with relation to the second mentioned contact through a movement of the tone-arm, and electrical connections between the electrical supply, the electro-magnet and the two contacts, whereby when the circuit is completed by the contacts during the travel of the tone-arm the electro-magnet is energized and its armature magnetized to release the said brake.

3. In a phonograph, the combination of a rotary record-supporting means, a brake adapted when released to automatically brake upon and arrest the movement of said record-supporting means, an electro-magnet, the armature of which, when deenergized, engages the brake and holds it in its inoperative position, a source of electrical supply, a swiveled tone-arm, an oscillating contact insulated from the tone-arm and supported adjacent the same, a contact carried by the tone-arm and adapted to contact with the first mentioned contact, means carried by the tone-arm for positioning the contact with relation to the contact of the tone arm, and electrical connections between the electrical supply, the electro-magnet, and the two contacts, whereby when the circuit is completed by the contacts caused by the travel of the tone-arm the electro-magnet is energized and its armature magnetized to release the said brake.

4. In a phonograph, the combination of a rotary record-supporting means, a brake adapted when released to automatically brake upon and arrest the movement of said record-supporting means, an electro-magnet, the armature of which, when deenergized, engages the brake and holds it in its inoperative position, a source of electrical supply, a swiveled tone-arm, an oscillating contact insulated from the tone-arm and adjacent the same, a contact carried by the tone-arm and adapted to contact with that of the base, means carried by the tone-arm for positioning said movable contact of the base with relation to the contact of the tone-arm, whereby the two are caused to establish a circuit at a predetermined point, and electrical connections between the electrical supply, the electro-magnet, and the two contacts, whereby when the circuit is completed by the contacts during the travel of the tone-arm the electro-magnet is energized and its armature magnetized to release the said brake.

5. In a phonograph, the combination of a rotary record-supporting means, a brake adapted when released to automatically brake upon and arrest the movement of said record-supporting means, an electro-magnet, the armature of which, when deenergized, engages the brake and holds it in its inoperative position, a source of electrical supply, a swiveled tone-arm, an oscillating bell-crank contact supported below and insulated from the tone-arm, a contact carried by the tone-arm and depending between the arms of said bell-crank contact and adapted to oscillate the same when said tone-arm is oscillated, and electrical connections between the electrical supply, the electro-magnet, and the two contacts.

6. In a phonograph, the combination of a record supporting means adapted to rotate, a brake adapted when released to automatically brake upon and arrest the movement of said record-supporting means, an electro-magnet, the armature of which, when deenergized, engages the brake and holds it in its inoperative position, a source of electrical supply, a base for a tone-arm having a central hub, a vertical shaft mounted in the hub, a tone-arm received by said base and supported upon said shaft, a bell-crank contact mounted to rotate upon and insulated from said shaft, a contact-arm depending from the tone-arm between the arms of the bell-crank contact and adapted to oscillate the latter when moved in one direction for the purpose of setting said bell-crank and to contact therewith upon its return movement to the same point, and electrical connections between the electrical supply, the electro-magnet, and the two contacts.

7. In a phonograph, the combination of a rotary record-supporting means, a stop adapted when released to brake upon and arrest the movement of said record-supporting means, an electro-magnet the armature of which when deenergized engages and hold said stop in its inoperative position, an annular tone-arm base provided with a bored hub, a vertically disposed shaft mounted in the hub and extending above and below the same, a bell-crank shaped contact mounted to oscillate upon the shaft below the hub and insulated therefrom and the shaft, a tone-arm received by the base and supported upon the upper end of said shaft and provided with a contact-arm depending between the arms of the bell-crank shaped contact and adapted to contact with said arms of the bell-crank shaped contact and oscillate the same, and an electrical circuit between the source of electrical supply, the electro-magnet, the bell-crank shaped contact and the tone-arm.

8. In a phonograph, the combination with a record-supporting means adapted to rotate, a brake means for stopping the same, an electro-magnet the armature of which is adapted when the magnet is deenergized to engage and hold said brake inoperative, a source of electrical supply, a tone-arm receiving base, a tone-arm mounted to oscillate therein and having a projecting contact, a bell-crank shaped oscillating contact carried by the base and having its arms positioned at either side of the projecting contact of the tone-arm and adapted to be struck thereby, a segmental contact-plate projecting from the bell-crank shaped contact, a pair of contact-plates, one of which is in sliding contact with said segmental contact-plate and the other of which is in circuit with the projecting contact-arm, and electrical connections between the source of electrical supply, the electro-magnet, and the two said contact-plates.

9. In a phonograph, the combination of a rotary record-support, an oscillating tone-arm, a contact carried thereby and therein, a stationary contact adjacent thereto, a movable electrical connection between the two contacts and adapted to be set by the movement of the tone-arm and disposed in the path of the contact carried thereby and in contact with a stationary contact, a stationary contact connected with the tone-arm, a stop-mechanism for the record-support adapted to normally arrest the movement of the latter, an electro-magnet the armature of which engages and withholds the stop-mechanism from its operative position when said electro-magnet is deenergized, a source of electrical supply, and electrical connections between the latter, the electro-magnet, the contact of the tone-arm, and the stationary contact.

10. In a phonograph, the combination of a rotary record-support, a motor for operating the same, a power supply for said motor, a cut-off for said supply, a stop-mechanism for arresting the movement of said record-support when said stop-mechanism occupies its normal position, an electrical-supply, an electro-magnet the armature of which is adapted when not influenced by the magnet to engage and withhold said stop-mechanism from its operative position, an oscillating tone-arm, a contact carried therein and thereby, a stationary contact adjacent the tone-arm and insulated therefrom, a movable contact supported adjacent the tone-arm in sliding contact with the stationary contact and disposed in the path of said contact of the tone-arm so as to be adjusted by the movement of the tone-arm, electrical connections between the electrical supply, the electro-magnet, the stationary contact and the tone-arm, and means carried by the stop-mechanism for operating the cut-off of power to the motor when said stop mechanism is released by said armature.

11. In a phonograph, the combination of a record-supporting means, a motor for operating the same, a stop-shaft adapted to oscillate, a stop-arm at the upper end of the shaft adapted to contact with and arrest the movement of the record-supporting means, a contact-arm at the lower end of the shaft, a spring for normally applying the stop-arm on the record-support, a spring contact-plate in the path of the contact-arm and adapted to contact therewith only when the stop-mechanism is out of its operating position, an electro-magnet the armature of which is normally in position to engage the contact-arm and render the stop-mechanism inoperative, a source of electrical supply, an oscillating tone-arm, a contact carried thereby, a contact located in the path of the contact of the tone-arm and adapted to engage the same when the tone-arm reaches a predetermined position, and electrical connections between the supply, the electro-magnet, the tone-arm contact and the companion contact and the stop-shaft contact-arm, and similar connections between the electrical supply, the motor, the contact-plate adjacent the stop-shaft.

12. In a phonograph, the combination with a turn-table, an oscillating shaft adjacent thereto and carrying a contact, an electro-magnet the armature of which is adapted to normally engage said contact, a brake carried by the shaft, a spring for normally throwing the brake into contact with the turn-table for arresting the rotation of the latter, of a stationary base-ring, a bored hub supported by radiating arms in said ring, a vertically disposed supporting-rod mounted in said hub, an insulating spool mounted on the rod below the hub, a ring mounted on the spool and provided at one side with arms angularly disposed with relation to each other and at the opposite side with a flared contact-plate, a contact-strip insulated from the base-ring and having movable contact with the flared contact-plate, a tone-arm having an internal bearing supported upon the upper end of said rod and adapted to swing, a stop-arm adapted to contact with the opposite hub-supporting arms of the ring to limit the oscillations of the tone-arm, a contact-arm depending from the tone-arm between the angularly disposed arms of the ring of the hub, a source of electrical-supply, a connection between the same and the tone-arm, the contact-strip, the electro-magnet and the contact-arm of the brake-carrying shaft.

13. In a phonograph, a rotary record support, a brake for arresting the movement of said support, electro-magnetic means for holding said brake in inoperative position, a tone-arm movable about a pivot, a contact insulated from said tone-arm, a contact located near said tone-arm and engageable with said insulated contact when said tone-arm reaches a predetermined position, one of said contacts being supported directly by said tone arm pivot, a source of electrical energy, and electrical connections between said source, said electro-magnetic means and said contacts, whereby completion of a circuit by said contacts causes said electro-magnetic means to release said brake.

14. In a phonograph, a movable record support, a brake for said support, means for holding said brake in inoperative position, a tone-arm movable about a pivot, a contact below and insulated from said tone-arm, a contact carried within said tone-arm and adapted to engage said first mentioned contact when said tone-arm reaches a predetermined position, one of said contacts being supported directly by said tone-arm pivot, a source of electrical energy, and electrical connections between said source, said brake holding means and said contacts, whereby completion of a circuit by said contacts causes release of said brake.

GEO. C. TROTTER.